United States Patent [19]

Shimizu et al.

[11] 4,395,534

[45] Jul. 26, 1983

[54] PROCESS FOR PRODUCING AROMATIC POLYESTER CARBONATE RESIN

[75] Inventors: Senzo Shimizu, Odawara; Isao Nomura; Masahiro Harada, both of Hiratsuka; Motohachi Usui, Odawara; Susumu Taniyama, Toyonaka; Shigeo Yanada, Osaka, all of Japan

[73] Assignee: Mitsubishi Gas Chemical Company, Inc., Tokyo, Japan

[21] Appl. No.: 322,244

[22] Filed: Nov. 17, 1981

[51] Int. Cl.³ .............................................. C08G 63/64
[52] U.S. Cl. ..................................... 528/126; 528/125; 528/128; 528/173; 528/176; 528/179; 528/180; 528/182; 528/190; 528/191
[58] Field of Search ............... 528/125, 126, 128, 173, 528/176, 179, 180, 190, 191, 182

[56] References Cited

U.S. PATENT DOCUMENTS

| | | | |
|---|---|---|---|
| 4,105,633 | 8/1978 | Swart et al. | 528/176 |
| 4,252,939 | 2/1981 | Mori et al. | 528/179 |
| 4,255,556 | 3/1981 | Segal | 528/179 |
| 4,297,455 | 10/1981 | Lindner et al. | 528/176 |
| 4,330,662 | 3/1982 | Bales | 528/176 |

*Primary Examiner*—Lester L. Lee
*Attorney, Agent, or Firm*—Wenderoth, Lind & Ponack

[57] ABSTRACT

A process for producing an aromatic polyester carbonate resin in which the molar ratio of the dihydric phenolic compound residue to aromatic dicarboxylic acid residue to carbonate bond is in the range of 2:0.5:1.5–2:1.4:0.6 and these constituent components form an alternating configuration of high regularity, said process comprising a first step wherein in producing a hydroxyl-terminated aromatic oligocarbonate by reacting a dihydric phenolic compound with a halogenated carbonyl compound in a reaction medium consisting of water and a water-immiscible solvent in the presence of a basic inorganic compound, the reaction is carried out by using the basic inorganic compound in an amount of 0.6–1.6 moles per mole of the dihydric phenolic compound and the halogenated carbonyl compound in an amount of 0.3–0.8 mole per mole of the dihydric phenolic compound to form a reaction product mixture consisting predominantly of a phenolic hydroxyl-terminated oligocarbonate of a degree of polymerization of 1–3, and a second step in which an esterification reaction is carried out by reacting the reaction product mixture obtained in the first step with an aromatic dicarboxylic acid dichloride in the presence of a basic inorganic compound in an amount at least sufficient to neutralize the free phenolic hydroxyl groups that remain in the reaction product mixture.

10 Claims, No Drawings

PROCESS FOR PRODUCING AROMATIC POLYESTER CARBONATE RESIN

FIELD OF THE INVENTION

This invention relates to a new process for producing an aromatic polyester carbonate resin having ester and carbonate bonds disposed in its polymer chain in an alternating configuration of high regularity, which process comprises using as starting materials a dihydric phenolic compound, an aromatic dicarboxylic acid dichloride and a halogenated carbonyl compound, and catalytically reacting these components in a reaction medium consisting of water and a water-immiscible solvent in the presence of a basic inorganic compound. More specifically, this invention relates to a process comprising a step in which a dihydric phenolic compound and a halogenated carbonyl are reacted in a reaction medium consisting of water and a water-immiscible solvent in the presence of a basic inorganic compound to prepare a phenolic hydroxyl-terminated aromatic oligocarbonate (this reaction step to be referred to as the first step); and a step in which, to the reaction product mixture obtained in the first step, is further added the basic inorganic compound in a required amount, and thereafter the esterification reaction is carried out by adding an aromatic dicarboxylic acid dichloride to give a high-molecular-weight polyester carbonate resin (this step to be hereinafter referred to as the second step), whereby there is produced an aromatic polyester carbonate resin conjointly possessing such superior properties as heat resistance and resistance to solvents as well as good moldability and mechanical properties.

BACKGROUND OF THE INVENTION

As processes for producing the aromatic polyester carbonate resins that have been suggested in the past, mention can be made of (a) the melt polycondensation process which involves carrying out a transesterification polycondensation reaction at elevated temperatures and a high vacuum; (b) the solution polycondensation process wherein the polycondensation reaction is carried out in an organic solvent at a low temperature; or (c) the interfacial polycondensation process wherein the polycondensation reaction is performed in a reaction medium consisting of water and a water-immiscible solvent in the presence of a basic inorganic compound.

In the case of the aforesaid processes (a) and (b), not only are the properties of the resulting resins poor, but there are also defects that are ascribable to the polymerization technique. On the other hand, the process (c) is considered to be a process of relatively great practicality. However, its drawback resides in the fact that a regular configuration of its constituent components cannot be achieved, with the consequence that difficulty is experienced in obtaining resins having satisfactory properties. While improvements in the process (c) have been proposed (see, for example, Japanese Laid-Open Patent Publication No. 25427/80), the operation is complicated in that the three steps of producing a dihydroxyterephthalic acid oligoester, chloroformating this ester and reacting the chloroformated product with a dihydric phenolic compound are required. Hence, this process cannot necessarily be regarded as being economical.

SUMMARY OF THE INVENTION

We experimented with a new method of carrying out the aforesaid interfacial polycondensation process (c) by completely changing the conventional method of first reacting a dihydric phenolic compound with an aromatic dicarboxylic acid dichloride, and thus arrived at the present invention. To wit, one of the features of the present invention resides in first reacting a dihydric phenolic compound with a halogenated carbonyl to produce a phenolic hydroxyl-terminated aromatic oligocarbonate. It is indeed surprising that this reaction can be controlled to form an aromatic oligocarbonate, despite the fact that it in theory synthesizes an aromatic polycarbonate.

This invention is directed to a production process by which an aromatic polyester carbonate resin, in which the configuration of the constituent components in the polymer chain are disposed systematically and the physical and chemical properties are maintained in a well balanced condition at a high level, can be produced by a simplified process using a simple synthesizing apparatus.

In accordance with this invention there is provided a process for producing an aromatic polyester carbonate resin in which the molar ratio of the dihydric phenolic compound residue to aromatic dicarboxylic acid residue to carbonate bond is in the range of 2:0.5:1.5–2:1.4:0.6 and these constituent components form an alternating configuration of high regularity, said process comprising a first step wherein, in producing a hydroxyl-terminated aromatic oligocarbonate by reacting a dihydric phenolic compound with a halogenated carbonyl in a reaction medium consisting of water and a water-immiscible solvent in the presence of a basic inorganic compound, the reaction is carried out by using the basic inorganic compound in an amount of 0.6–1.6 moles per mole of the dihydric phenolic compound and the halogenated carbonyl in an amount of 0.3–0.8 mole per mole of the dihydric phenolic compound to form a reaction product mixture containing predominantly a phenolic hydroxyl-terminated aromatic oligocarbonate having a degree of polymerization of 1–3, and a second step in which an esterifying polycondensation reaction is carried out by reacting the reaction product mixture obtained in the first step with an aromatic dicarboxylic acid dichloride in the presence of a basic inorganic compound in an amount at least sufficient to neutralize the free phenolic hydroxyl groups that remain in the reaction product mixture.

In view of the high regularity of the alternating configuration of the polymer obtained in this invention, it conjointly possesses the superior properties that are inherently possessed by the well-known polycarbonate resins and polyarylate resins. Specifically, its glass transition temperature and heat distortion temperature under load are high, and it excels in its resistance to solvents, resistance to hydrolysis and thermal stability. In addition, it is colorless and transparent and excels in its moldability. Furthermore, the washing of the resulting polymer and its solidification can be performed easily, and the burden of recovering the solvent is also extremely light in accordance with the process of this invention. The present invention thus provides a process that is highly practical and economically profitable.

DETAILED DESCRIPTION OF THE INVENTION

The first step of this invention, the step in which the aromatic oligocarbonate having terminal phenolic hydroxyl groups and a degree of polymerization of 1–3 is predominantly produced, is carried out by making a dihydric phenolic compound react with a halogenated carbonyl in the presence of a basic inorganic compound such as potassium hydroxide, sodium hydroxide, lithium hydroxide, calcium hydroxide, sodium carbonate and trisodium phosphate. In this reaction, in the past, it has been the usual practice that the basic inorganic compound is added to water along with the dihydric phenolic compound, and an aqueous solution in which all of the dihydric phenolic compound is dissolved in the form of a phenolic salt is used. Contrary to the usual practice, one of the important conditions of this invention is that the amount of the basic inorganic compound comes within the range of 0.6–1.6 moles per mole of the dihydric phenolic compound. Thus, the dihydric phenolic compound is only partially neutralized by the adoption of this condition, with the consequence that there remains in the reaction medium a dihydric phenolic compound that does not form a salt in a solid state. It was however found that even in a reaction system of this kind the phenolic hydroxyl group and the halogenated carbonyl readily react to give the aromatic oligocarbonate having a degree of polymerization of 1–3 with good selectivity and in good yield. For obtaining the oligocarbonate of this invention, the foregoing condition is critical. When the upper limit is exceeded, high-molecular-weight aromatic oligocarbonates having a degree of polymerization of 4 or more are formed and, at the same time, there remains a large amount of the unreacted dihydric phenolic compound that did not participate in the reaction. Hence, the properties of the product resin, are adversely affected especially its moldability and resistance to solvents. On the other hand, when the amount of the basic inorganic compound is less than the lower limit, the unreacted halogenated carbonyl remains, and not only is there a decline in the yield of the desired aromatic oligocarbonate, but also the properties of the product resin are impaired.

Another important condition in carrying out the first step of the present invention is that the amount of the halogenated carbonyl compound must be in the range of 0.3–0.8 mole per mole of the dihydric phenolic compound. If the amount used is less than the lower limit, an increase takes place in the amount of unreacted dihydric phenolic compound, with the consequence that in the second step an insoluble resin will be formed in the reaction medium as a result of the reaction with the aromatic dicarboxylic acid dichloride. Hence, polymerization of the product to a high degree is checked to adversely affect the transparency and moldability of the product. On the other hand, when the upper limit of the amount of the halogenated carbonyl is exceeded, the degree of polymerization of the oligocarbonate rises, and this results in a decline in the property of the polymer to form a systematic alternating configuration of its constituent components. Hence, it becomes impossible to obtain a resin having the properties as intended by this invention.

The dihydric phenolic compound used in the process of this invention is suitably selected from the group consisting of the bisphenol-type compounds of the formula

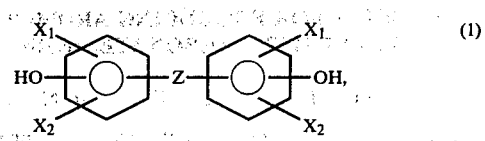

the dihydric phenolic compounds of the formula

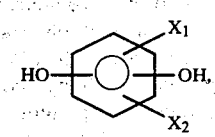

and the phenolphthalein-type compounds of the formula

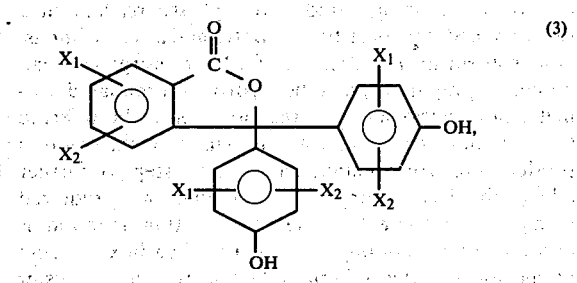

in which general formulas $X_1$ and $X_2$ are each a member of the group consisting of hydrogen, chlorine, bromine and the lower alkyl groups, and Z is a straight-chain or branched alkylene group of fewer than 9 carbon atoms or a bridging member selected from the group consisting of the —O—, —S—, —CO— and —$SO_2$— groups. Typical examples of the compounds of these general formulas include 2,2-bis(4-hydroxyphenyl) propane, 2,2-bis(3,5-dibromo-4-hydroxyphenyl)propane, 2,2-bis(3,5-dichloro-4-hydroxyphenyl)propane, bis(4-hydroxyphenyl)methane, bis(4-hydroxyphenyl)sulfone, bis(4-hydroxyphenyl)ketone, hydroquinone, resorcinol and phenolphthalein. The dihydric phenolic compound is preferably used in such an amount that its concentration in the aqueous phase of the reaction medium used in the first step is in the range of 0.05–2 moles, preferably 0.1–1.0 mole, per liter.

As the halogenated carbonyl to be used in the process of this invention, for example, either phosgene or trichloromethylchloroformate ($Cl_3COCOCl$) can be mentioned, but phosgene is usually used. The phosgene is fed with stirring in a gaseous or liquid state or as a water-immiscible solvent solution to the aqueous phase containing the dihydric phenolic compound or the water-immiscible solvent phase.

The water-immiscible solvent, as used herein, is an organic solvent which, when mixed with water, does not completely dissolve therein, but in which at least a part thereof separates from water to form two layers. It furthermore is an organic solvent that can dissolve phosgene or the aromatic dicarboxylic acid dichlorides while being inert thereto, and can also dissolve the intended aromatic polyester carbonate resin. Typical examples of such an organic solvent are the chlorinated hydrocarbons such as methylene chloride, 1,2-dichloroethane, 1,1,2,2-tetrachloroethane, chloroform, 1,1,1-trichloroethane, carbon tetrachloride, monochlorobenzene and dichlorobenzene; the aromatic hydrocarbons such as benzene, toluene, xylene and ethylbenzene; and the aliphatic ether compounds such as diethyl ether. These organic solvents can also be used in combination of two or more thereof. If desired, these water-immiscible solvents can also be mixed with those solvents that have affinity for water such as ethers other than that mentioned above, ketones, esters and nitriles. The proportion in which these solvents are mixed with the water-immiscible solvents is of course limited to the extent that there must not be complete compatibility between the mixed solvents and water. The mixture ratio between the water-immiscible solvent and water may be in the range of 50/1–1/40 by volume, but from the standpoint of the operational management of the process of this invention, a range of 5/1–1/5 is preferred.

One specific mode of practicing the first step of this invention is carried out in the following manner. A dihydric phenolic compound is added to a reaction system consisting of an aqueous phase containing a basic inorganic compound and a water-immiscible solvent phase. This is followed by continuously introducing a halogenated carbonyl with stirring over a period ranging from several minutes to several hours. The reaction temperature at this time is controlled so as to be in the range of 0°–40° C., preferably 5°–30° C. For controlling the carbonylation reaction and enhancing the yield of and selectivity for the intended aromatic oligocarbonate, it is also possible to employ a method which comprises adding a part of the basic inorganic compound to the aqueous phase and then adding the remainder dropwise as an aqueous solution along with the introduction of the halogenated carbonyl. The time required for completion of the carbonylation reaction after the total amount of the halogenated carbonyl has been introduced will depend upon the reaction conditions, but usually 4 hours should be sufficient. The addition of a reducing agent such as sodium hydrosulfite in the first step for preventing the discoloration of the dihydric phenolic compound and in turn for preventing the discoloration of the resulting aromatic polyester carbonate is effective, and it is hence being practiced preferentially. For promoting the carbonylation reaction of the first step and for checking the amount of the halogenated carbonyl consumed for the carbonylation reaction, i.e., for restraining the hydrolysis of the halogenated carbonyl, it is effective to add the known tertiary amines or quaternary ammonium salts as a carbonylation catalyst.

The aromatic oligocarbonate obtained in the first step is then submitted to the esterification reaction of the second step where it is reacted with an aromatic dicarboxylic acid dichloride to give the polyester carbonate. Examples of the aromatic dicarboxylic acid dichloride include terephthaloyl dichloride, 2-chloroterephthaloyl dichloride, 2,5-dichloroterephthaloyl dichloride, isophthaloyl dichloride, 4-chloroisophthaloyl dichloride, 5-chloroisophthaloyl dichloride and 2,3,5,6-tetrachloroterephthaloyl dichloride. These aromatic dicarboxylic acid dichlorides are usually rendered into a homogeneous solution by dissolving them in a water-immiscible solvent as mentioned above and then catalytically reacted by adding the resulting solution dropwise with stirring to the reaction product mixture resulting from completion of the first step reaction. The aromatic dicarboxylic acid dichloride is used in an amount such that the sum of it with the halogenated carbonyl comes within the range of 1.0–1.5 moles per mole of the dihydric phenolic compound. Further, its concentration in the water-immiscible solvent phase of the second step should be such that it falls within the range of 0.1–4 moles, preferably 0.2–2 moles, per liter of the solvent phase.

The second step is carried out in the copresence of a basic inorganic compound. This basic inorganic compound is used in an amount sufficient to neutralize the free phenolic hydroxyl groups present in the reaction product mixture obtained in the first step. In other words, the basic inorganic compound should be used in an amount ranging between 2 and 3 moles per mole of the aromatic dicarboxylic acid dichloride.

For promoting the esterification and polycondensation reaction of the second step and thus facilitating production of a product having a high degree of polymerization, it is preferred that known tertiary amines or quaternary ammonium salts be used as a catalyst. Examples of the tertiary amines are trimethylamine, triethylamine, tributylamine, tripropylamine, trihexylamine, tridecylamine, N,N-dimethylcyclohexylamine, pyridine, quinoline and dimethylaniline. The quaternary ammonium salts include for example, trimethylbenzyl ammonium chloride and tetramethyl ammonium chloride. It will suffice to use these catalysts in an amount of not more than 0.5 mole per mole of the aromatic dicarboxyluic acid dichloride. Again, the tertiary amines and quaternary ammonium salts may also be conjointly used.

Further, a molecular weight control agent is used in carrying out the polycondensation reaction of the second step for controlling the molecular weight of the intended aromatic polyester carbonate to ensure that it has the desired molecular weight. Examples of molecular weight control agents are the monohydric phenols such as phenol, o-phenylphenol, p-phenylphenol, o-methoxyphenol, m-methoxyphenol, cumyl phenol and p-tert.-butyl phenol; the monobasic acid chlorides such as benzoic acid monochloride; and the monoamines such as aniline. The amount of the molecular weight control agent is suitably chosen within the range of 0.001–0.1 mole per mole of the dihydric phenolic compound used in the first step. There is imposed no particular restriction as to when the molecular weight control agent is added, and it may be added during the first step or the second step, or it may be added portionwise during the second step.

In one specific mode of practicing the second step, an aqueous solution of the basic inorganic compound and molecular weight control agent is added along with a polycondensation promoting catalyst to the oligoester-containing reaction product mixture obtained in the first step, following which the water-immiscible solvent solution of the aromatic dicarboxylic acid dichloride is added dropwise with stirring. While the period of time over which the addition of the aromatic dicarboxylic acid dichloride is made can be chosen from that ranging from several seconds to several hours, the addition is usually completed in 10 seconds to 2 hours. A reaction temperature of 0°–75° C., and preferably 5°–50° C., is used. A time of up to 5 hours, usually about 3 hours, should be sufficient for concluding the esterification and polycondensation reactions after completion of the addition of the aromatic dicarboxylic acid dichloride.

The second step of this invention can also be carried out in the following manner. After allowing the reaction product mixture obtained in the first step to stand and separate into two layers, the water-immiscible solvent phase is removed and concentrated. Using the resulting solution, the esterification reaction is then carried out as described hereinbefore. Alternatively, the second step can also be carried out by isolating the oligoester of a degree of polymerization of 1-3 from the reaction product mixture obtained in the first step and then submitting this oligomer to an esterification reaction.

In obtaining the intended aromatic polyester carbonate resin from the reaction product mixture whose esterification has been completed in the second step of this invention, the following procedure is followed. After separating the reaction product mixture into two layers by allowing it to stand, the water-immiscible solvent phase is removed, following which it is submitted to such operations as washing, isolation and solidification in a customary manner. When difficulty is experienced in effecting the separation of the reaction product mixture into two layers, such known operations as adjustment of pH, addition of a salting out agent or centrifugation may be employed. The isolation and solidification can be carried out in a customary manner. For example, it is acceptable to use a method of completely distilling off the water-immiscible solvent under normal atmospheric or reduced pressure; or a method of adding a poor solvent for the resulting polymer, that dissolves in the water-immiscible solvent used in the reaction but does not dissolve the resulting polymer, for example, the organic solvents such as methanol, ethanol, acetone, ethyl acetate, isopropyl ether, n-hexane, cyclohexane and methyl ethyl ketone; or, conversely, a method of adding the polymer-containing water-immiscible solvent solution to these poor solvents.

In a method which uses these poor solvents, the water-immiscible solvent solution, and the reaction product mixture, can be concentrated to a certain degree in advance, thus reducing the amount of the poor solvent used. It is hence an effective method.

The following examples will serve to illustrate the present invention more specifically.

EXAMPLE 1

A 1-liter reaction vessel equipped with a stirrer was charged with 2.15 g (0.0538 mole) of sodium hydroxide, 0.05 g of sodium hydrosulfite and 35.5 g (0.1555 mole) of bisphenol A, after which 200 ml of water and 125 ml of methylene chloride were added and a solution was formed by stirring at room temperature. More than one-half of the bisphenol A added did not dissolve in the aqueous phase and methylene chloride phase but remained in a dispersed state. While maintaining the inside temperature of the reaction vessel at 18°-20° C., a solution of 7.26 g (0.0734 mole) of phosgene in 100 ml of methylene chloride and a solution of 4.3 g (0.1075 mole) of sodium hydroxide in 100 ml of water were added dropwise concurrently to the reaction vessel over the course of 60 minutes with stirring. Bisphenol A which had been in a dispersed state at the outset of the reaction started to dissolve with the dropwise addition of the methylene chloride solution of phosgene and was almost completely dissolved in the reaction medium by the time about two-thirds of the total amount of the methylene chloride solution of phosgene had been added. After having completed the addition of all of the methylene chloride solution of phosgene, the stirring was continued for a further 3 hours to complete the synthesis of a dihydroxycarbonate oligomer in the first step. This was followed by the addition of a solution in 80 ml of water of 10.0 g (0.25 mole) of sodium hydroxide, 0.05 ml of triethylamine and 0.5 g of p-tert.-butyl phenol and also, while maintaining the inside temperature at 21°-23° C., the dropwise addition of a solution of 16.85 g (0.083 mole) terephthaloyl dichloride in 100 ml of methylene chloride over the course of 30 minutes with stirring. After having completed the addition of all of the terephthaloyl dichloride, the reaction was continued for a further 1.5 hours to complete the esterification and polycondensation reaction of the second step. After completion of the reaction, the stirring was stopped, and the reaction mixture was left to stand. After about an hour, the reaction mixture separated into two layers that were somewhat turbid, the top layer being the aqueous phase, while the bottom layer was the methylene chloride phase. All of the bottom methylene chloride phase was added dropwise to 3 liters of methanol with stirring. The precipitating white solid polymer was recovered and dried. The weight of the polymer thus obtained was 47.14 g, which corresponded to a yield of 96.1%. A thin film was made by the solvent (methylene chloride) film-making method from a part of the polymer obtained and was analyzed by infrared absorption spectroscopy. When the compositional ratio (mole ratio) of bisphenol A residue:terephthalic acid residue:carbonate bond contained in the polymer was determined from the absorbance ratio having its characteristic absorptions at 1740 and 1770 nm in accordance with the method taught in *Vysokomol. Ser*, A9 [5] page 1012 (1967), it was 2:1:1. The inherent viscosity ($\eta$ inh) of this polymer as measured at 25° C. in a methylene chloride solution of the polymer at a concentration of 1 g/100 ml was as follows:

$$\eta inh = \frac{\ln (t_0/t_1)}{C} = 0.723$$

where:
C is the concentration of the polymer in the methylene chloride solution (g/dl)
$t_0$ is the falling time of methylene chloride alone (sec)
$t_1$ is the falling time of the methylene chloride solution (sec)

When a compression molded piece obtained by heat-melting this polymer at 300° C. for 10 minutes in an atmosphere of nitrogen was used, and the glass transition temperature (Tg) of the polymer was determined by the thermo mechanical analysis method described in Zakin, J. L. et al., *J. Apply. Polymer Sci.*, vol. 10, page 1455 (1966), it was 176° C., while the heat distortion temperature under load as measured by the ASTM Method D-648 (HDT, 264 psi) was 166° C.

Further, the reaction of the first step was carried out by the same procedure under identical conditions, and the resulting reaction mixture was analyzed. To wit, a part of the methylene chloride phase that separates as a result of having left the reaction mixture to stand after completion of the reaction of the first step was submitted to a GPC analysis (using a column packed with a commercial product, trade name "SHODEX A802", as a stationary phase; methylene chloride as a developing agent.) It was confirmed by this analysis that there was formed a phenolic hydroxyl-terminated bisphenol A oligocarbonate consisting predominantly of an oligocarbonate of a degree of polymerization of 1-2. Further, when the unreacted bisphenol A that precipitated out on acidifying the reaction mixture with phosphoric acid was weighed, it was 3.5 g, and when the amount of unreacted bisphenol A remaining dissolved in the methylene chloride phase was determined by the GPC internal standard method, it was 4.6 g. It was thus found that the conversion of bisphenol A in the first step was 77.2 mole %.

EXAMPLE 2

The reaction of the first step was carried out by the same procedure and conditions as in Example 1, following which 0.5 g of p-tert.-butyl phenol and 0.05 ml of triethylamine were added to the resulting reaction mixture. This was followed by the dropwise addition, with stirring, of a solution of 16.85 g (0.83 mole) of isophthaloyl dichloride in 100 ml of methylene chloride and a solution of 10.0 g (0.25 mole) of sodium hydroxide in 80 ml of water concurrently over the course of 30 minutes. After having added all of the isophthaloyl dichloride, the reaction was continued for a further 1.5 hours to complete the reaction of the second step. The resulting polymer had an $\eta$ inh=0.688, a Tg=160° C., and a HDT (264 psi)=149° C.

EXAMPLE 3

In synthesizing the bisphenol A oligocarbonate of the first step by the same procedure as in Example 1, the reaction was carried out using 0.05 ml of triethylamine as a catalyst. After completion of the first step reaction, a solution in 80 ml of water of 10.1 g (0.2525 mole) of sodium hydroxide and 0.6 g of p-tert.-butyl phenol was added. This was followed by the dropwise addition, with stirring, of a solution of 16.85 g (0.83 mole) of terephthaloyl dichloride in 100 ml of methylene chloride over the course of about 20 seconds while maintaining the reaction temperature at 20°-23° C. The reaction was then continued for a further 1.5 hours to complete the reaction. The resulting polymer had an $\eta$ inh=0.635, a Tg=166° C. and a HDT (264 psi)=158° C.

EXAMPLE 4

A stirrer-equipped reaction vessel was charged with 2.8 g (0.07 mole) of sodium hydroxide, 34.245 g (0.15 mole) of bisphenol A, 0.05 g of sodium hydrosulfite, 200 ml of water and 125 ml of methylene chloride, to which reaction vessel were then added dropwise with stirring a solution of 9.39774 g (0.095 mole) of phosgene in 150 ml of methylene chloride and a solution of 5.6 g (0.14 mole) of sodium hydroxide in 100 ml of water over the course of 75 minutes while maintaining the reaction temperature at 18°-20° C. The reaction was continued for a further 2.5 hours to complete the reaction of the first step. This was followed by the addition of a solution in 100 ml of water of 5.568 g (0.1392 mole) of sodium hydroxide, 0.5 g of p-tert.-butyl phenol and 0.06 ml of triethylamine and, while maintaining the reaction temperature at 20°-23° C., the dropwise addition with stirring of a solution of 11.775 g (0.058 mole) of terephthaloyl dichloride in 100 ml of methylene chloride over the course of about 30 seconds. The reaction was continued for a further one hour after completion of the addition. At this point, a further addition was made of a solution of 0.5 g of p-tert.-butyl phenol in 10 ml of methylene chloride. The reaction was continued for another 30 minutes to complete the esterification and polycondensation reaction of the second step.

The resulting polymer had a bisphenol A residue: terephthalic acid residue:carbonate bond mole ratio of 2:0.77:1.23, an $\eta$ inh=0.574, a Tg=162° C. and a HDT (264 psi)=150° C.

EXAMPLE 5

A reaction vessel was charged with 4.72 g (0.118 mole) of sodium hydroxide, 24.17 g (0.6043 mole) of bisphenol A, 0.05 g of sodium hydrosulfite, 450 ml of water and 300 ml of methylene chloride, following which 5.25 g (0.0531 mole) of phosgene was blown in a gaseous state into the reaction vessel with stirring over the course of 30 minutes. After completion of the addition of the phosgene, the reaction was continued for a further 2 hours to complete the reaction of the first step. Following completion of the first step reaction, a solution in 150 ml of water of 5.6 g (0.14 mole) of sodium hydroxide, 0.4 g of p-tert.-butyl phenol, and 0.137 g of trimethylbenzyl ammonium chloride was added and, while maintaining the reaction temperature at 23°-25° C., a solution of 10.76 g (0.053 mole) of terephthaloyl dichloride in 100 ml of methylene chloride was added dropwise over the course of about 20 seconds. Thirty minutes after completion of the addition of the terephthaloyl dichloride solution, 0.03 ml of triethylamine was added, and the reaction was continued for a further 1.5 hours to complete the esterification and polycondensation reaction of the second step. The resulting polymer had an $\eta$ inh=0.517, a Tg=174° C. and a HDT (264 psi)=163° C.

What is claimed is:

1. A process for producing an aromatic polyester carbonate resin in which the molar ratio of dihydric phenolic compound residue to aromatic dicarboxylic acid residue to carbonate bond is in the range of 2:0.5:1.5–2:1.4:0.6 and said constituent components form a substantially completely regular alternating configuration, said process comprising a first step wherein, in producing a hydroxyl-terminated aromatic oligocarbonate by reacting a dihydric phenolic compound with a halogenated carbonyl compound in a reaction medium consisting of water and a water-immiscible solvent in the presence of a basic inorganic compound, the reaction is carried out by using the basic inorganic compound in an amount of 0.6–1.6 moles per mole of the dihydric phenolic compound and the halogenated carbonyl compound in an amount of 0.3–0.8 mole per mole of the dihydric phenolic compound to form a reaction product mixture consisting predominantly of a phenolic hydroxyl-terminated oligocarbonate having a degree of polymerization of 1–3, and a second step in which an esterification reaction is carried out by reacting the reaction product mixture obtained in the first step with an aromatic dicarboxylic acid dichloride in the presence of a basic inorganic compound in an amount at least sufficient to neutralize the free phenolic hydroxyl groups that remain in the reaction product mixture.

2. The process of claim 1 wherein said dihydric phenolic compound is a member selected from the group consisting of the bisphenol-type compounds of the formula

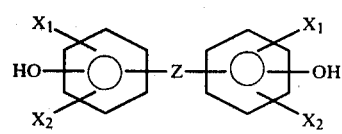

wherein $X_1$ and $X_2$ are each a member selected from the group consisting of hydrogen, chlorine, bromine and lower alkyl, and Z is a straight-chain or branched alkylene group of fewer than 9 carbon atoms or a bridging member selected from the group consisting of —O—, —S—, —CO— and —SO$_2$—; the dihydric phenolic compounds of the formula

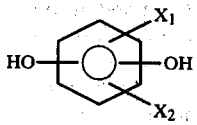

where X$_1$ and X$_2$ are defined above; and the phenolphthalein-type compounds of the formula

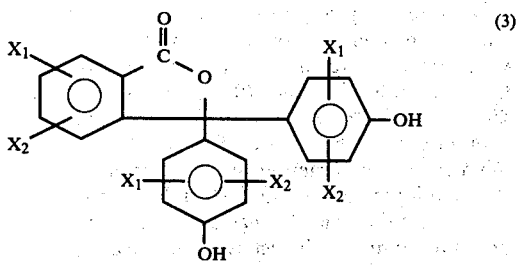

(3)

wherein X$_1$ and X$_2$ are as defined above.

3. The process of claim 1 wherein said halogenated carbonyl compound is a compound selected from the group consisting of phosgene and trichloromethylchloroformate.

4. The process of claim 1 wherein said aromatic dicarboxylic acid dichloride is a member selected from the group consisting of terephthaloyl dichloride, 2-chloroterephthaloyl dichloride, 2,5-dichloroterephthaloyl dichloride, isophthaloyl dichloride, 4-chloroisophthaloyl dichloride, 5-chloroisophthaloyl dichloride and 2,3,5,6-tetrachloroterephthaloyl dichloride.

5. The process of claim 1 wherein said aromatic dicarboxylic acid dichloride is used in an amount such that the sum of the amounts of the aromatic dicarboxylic acid dichloride and the halogenated carbonyl compound comes within the range of 1.0 to 1.5 moles per mole of the dihydric phenolic compound.

6. The process of claim 1 wherein said basic inorganic compound is a member selected from the group consisting of potassium hydroxide, sodium hydroxide, lithium hydroxide, calcium hydroxide, sodium carbonate and trisodium phosphate.

7. The process of claim 1 wherein said water-immiscible solvent is an organic solvent which, when mixed with water, does not completely dissolve therein, but in which at least a part of the solvent separates from water to form two layers.

8. The process of claim 7 wherein said organic solvent is a member selected from the group consisting of chlorinated hydrocarbons, aromatic hydrocarbons and aliphatic ether compounds.

9. The process of claim 8 wherein said organic solvent is methylene chloride.

10. The process of claim 1 which comprises carrying out the reaction of the first step at a temperature of 0°–40° C. and the reaction of the second step at a temperature of 0°–75° C.

* * * * *